US009434842B2

(12) United States Patent
Wang et al.

(10) Patent No.: US 9,434,842 B2
(45) Date of Patent: Sep. 6, 2016

(54) MIX COMPOSITION DETERMINATION METHOD OF COARSE GRADED HIGH MODULUS ASPHALT CONCRETE WITH SKELETON EMBEDDED STRUCTURE

(71) Applicants: RESEARCH INSTITUTE OF HIGHWAY, MOT, PRC, Beijing (CN); GUANGXI COMMUNICATIONS INVESTMENT GROUP CO., LTD, Guangxi (CN); BEIJING MUNICIPAL ROAD & BRIDGE BUILDING MATERIAL GROUP CO., LTD, Beijing (CN)

(72) Inventors: Xudong Wang, Beijing (CN); Qin Fu, Nanning (CN); Xingye Zhou, Beijing (CN); Zhijie Chen, Nanning (CN); Lei Zhang, Beijing (CN); Hao Liu, Beijing (CN); Chaoyang Guo, Beijing (CN); Qian Xiao, Beijing (CN)

(73) Assignees: RESEARCH INSTITUTE OF HIGHWAY, MOT, PRC, Beijing (CN); GUANGXI COMMUNICATIONS INVESTMENT GROUP CO., LTD., Nanning (CN); BEIJING MUNICIPAL ROAD & BRIDGE BUILDING MATERIAL GROUP CO., LTD., Beijing (CN)

( * ) Notice: Subject to any disclaimer, the term of this patent is extended or adjusted under 35 U.S.C. 154(b) by 0 days.

(21) Appl. No.: 14/348,867

(22) PCT Filed: Oct. 16, 2012

(86) PCT No.: PCT/CN2012/083044
§ 371 (c)(1),
(2) Date: Mar. 31, 2014

(87) PCT Pub. No.: WO2013/056642
PCT Pub. Date: Apr. 25, 2013

(65) Prior Publication Data
US 2014/0245925 A1 Sep. 4, 2014

(30) Foreign Application Priority Data
Oct. 17, 2011 (CN) .......................... 2011 1 0315278

(51) Int. Cl.
*C08L 95/00* (2006.01)
*C04B 26/26* (2006.01)
*C04B 111/00* (2006.01)

(52) U.S. Cl.
CPC ................ *C08L 95/00* (2013.01); *C04B 26/26* (2013.01); *C04B 2111/0075* (2013.01); *C08L 2555/10* (2013.01)

(58) Field of Classification Search
CPC ... C08L 95/00; C08L 95/005; C09K 3/1463; E01C 7/18
See application file for complete search history.

(56) References Cited

U.S. PATENT DOCUMENTS

2010/0144521 A1* 6/2010 Constantz et al. ............ 502/400

FOREIGN PATENT DOCUMENTS

| CN | 1932153 | * | 3/2007 |
| CN | 101463584 A | | 6/2009 |

(Continued)

OTHER PUBLICATIONS

Hong, W Li Q S, Quan G Q, et al. Pavement performance and application of anion rubber-modified asphalt. Chin Sci Bull, 2012, 57: 2323-2328, doi: 10.1007/S11434-012-5065-7.*
Pavement Interactive Article "Bulk Specific Gravity"; http://www.pavementinteractive.org/article/bulk-specific-gravity/.*

(Continued)

*Primary Examiner* — Kaj K Olsen
*Assistant Examiner* — Alexandra M Moore
(74) *Attorney, Agent, or Firm* — Maschoff Brennan

(57) ABSTRACT

The invention relates to mix composition determination method of coarse graded high modulus asphalt concrete with skeleton embedded structure, which belongs to the road engineering design field. The invention use low labeled hard asphalt AH-30# with penetration degree no greater than 30 (0.1 mm); the nominal maximum aggregate size no smaller than 26.5 mm; building mineral aggregate gradation of the mix using course aggregate gap gradation; using gradation design method of asphalt mixture based on closest compact condition to select the optimal oil-stone ratio.

6 Claims, 3 Drawing Sheets

(56) References Cited

FOREIGN PATENT DOCUMENTS

Figure 1:
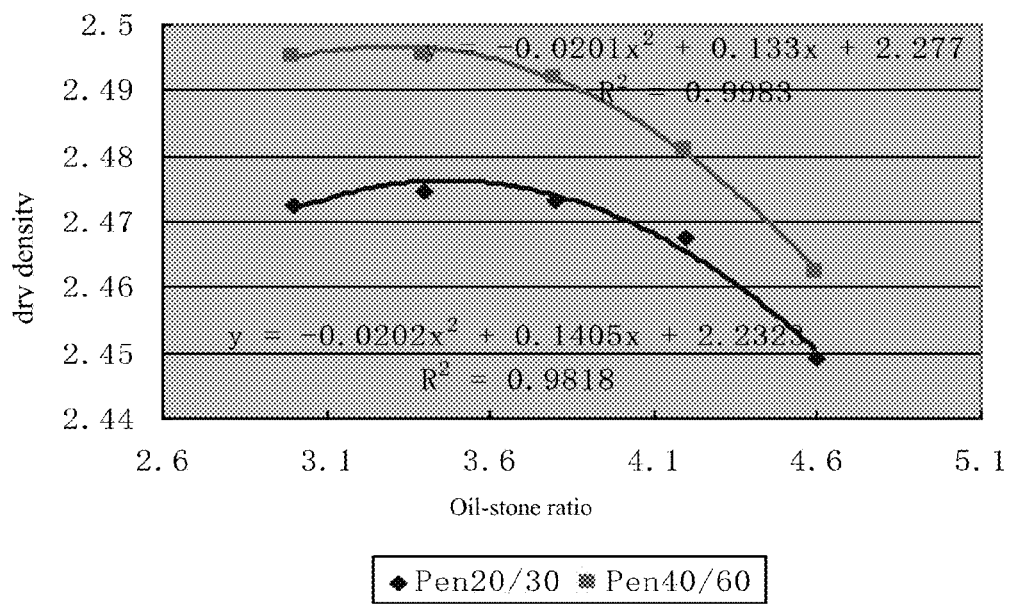

| | | | |
|---|---|---|---|
| CN | 101477012 A | | 7/2009 |
| CN | 101746995 A | | 6/2010 |
| CN | 102094377 A | * | 6/2011 |
| CN | 102503244 A | | 6/2012 |
| JP | 2005-240441 A | | 9/2005 |

OTHER PUBLICATIONS

Pavement Interactive Article "Theoretical Maximum Density"; http://www.pavementinteractive.org/article/theoretical-maximum-specific-gravity/.*

Viscosity Grading | Pavement Interactive, PaviaSystems, Aug. 16, 2007, Retrieved from <http://www.pavementinteractive.org/article/viscosity-grading/>.

* cited by examiner

Appended figures

MIX COMPOSITION DETERMINATION METHOD OF COARSE GRADED HIGH MODULUS ASPHALT CONCRETE WITH SKELETON EMBEDDED STRUCTURE

TECHNICAL FIELD

The invention relates to the composition determination method of a kind of high quality asphalt concrete used in road engineering, especially high modulus asphalt concrete that use low labeled hard asphalt with penetration degree of 30 (0.1 mm), and the nominal maximum aggregate size no smaller than 26.5 mm, including the gradation structure, optimal asphalt content and road performance verification requirements.

TECHNICAL BACKGROUND

High modulus asphalt concrete mainly adopts low labeled hard asphalt as the cementing material, the characteristics of high viscosity, high stiffness and low temperature sensitivity of low labeled hard asphalt provides excellent high temperature stability and high modulus value to the asphalt mixture, it can improve the pavement anti-rutting ability and have certain structure reinforcing effect, and also can prolong the service life of road and thinning thickness of road surface, reduce the cost when it is used as middle and lower layer of the asphalt pavement.

High modulus asphalt concrete is mainly applied in some developed countries in Europe. It is early studied and the most widely used in French, there the technology is mature, Other countries such as Britain, Finland and so on mainly reference the experience of France's achievements and carry out related research and application. Currently, the main design method of high modulus asphalt concrete abroad is the maximum nominal size is not more than 19 mm, using low grade asphalt with low penetration and continuous gradation, the asphalt mixture designed have higher asphalt content and low void ratio, the increasing of the mix modulus is mainly from the quality of the asphalt itself, and by increasing the dosage of asphalt to improve the compactness of asphalt mixture and the ability to resist fatigue.

But for heavy traffic asphalt pavement and long-life asphalt pavement design, the key problem is to improve the bearing capacity of pavement structure and ensure the high temperature stability of the surface, especially for the middle and lower layer, material not only to provide good ability to anti-rutting, also requires a certain structure reinforcing effect. Because the design method of high modulus asphalt concrete abroad is not applicable to coarse grain type of the nominal maximum aggregate size greater than 19 mm, and its design idea is to choose continuous gradation and higher binder dosage, the air void of asphalt mixture designed is low, which is not applicable to the case of heavy traffic. Therefore, inventing a kind of mix composition determination method of coarse graded high modulus asphalt concrete with skeleton embedded structure is very necessary.

Invention Content

The aim of the present invention is to meet the construction need of long-life and durable asphalt pavement, put forward a kind of new coarse graded high modulus asphalt concrete with skeleton embedded structure which is technology reliable and economy reasonable, this kind of asphalt mixture has good high temperature stability and bearing capacity, its strength is 50% higher than that of the general asphalt mixture, its dynamic complex modulus is 30% higher than that of similar foreign products, it has very excellent road performance, can be used as the material of middle and lower layer of overloading traffic long-life asphalt pavement, and reduce the project cost.

Mix composition determination method of coarse graded high modulus asphalt concrete with skeleton embedded structure includes the following steps: 1, the preparation of raw materials, 2, determine the design curve, 3, determine the optimum proportion.

For step 1, choosing low labeled hard asphalt with penetration degree of no higher than 30 as the cementing material, choosing coarse aggregate, fine aggregate and mineral powder, the maximum nominal size of the coarse aggregate is no smaller than 26.5 mm.

Step 2 including the following steps: (1), according to the need of designation, determine the maximum nominal size of coarse graded asphalt concrete and the aggregate passing rate of the three key meshes, cut-off point of coarse aggregate and fine aggregate 4.75 mm and 0.075 mm, (2), using formula 1 the maximum nominal size determined and the aggregate passing rate of the two key meshes of 4.75 mm, calculate coefficient A and B, determine the specific expression of the formula 1; using formula 2 the aggregate passing rate of the two key meshes of 4.75 mm and 0.075 mm, calculate coefficient C and D, determine the specific expression of the formula 2.

$$P_{di} = A(d_i)^B \qquad \text{(formula 1)}$$

$P_{di}$—Passing rate of coarse aggregate sieve size $d_i$, %;
$d_i$—sieve size of coarse aggregate, mm
A, B—coefficient $$P_{dj} = C(d_j)^D \qquad \text{(formula 2)}$$

$P_{dj}$—Passing rate of fine aggregate sieve size $d_j$, %;
$d_j$—sieve size of fine aggregate, mm
C, D—coefficient (3), calculate the passing rate of each sieve between the maximum nominal size and 4.75 mm by formula 1; calculate the passing rate of each sieve between 4.75 mm and 0.075 mm by formula 2, then get the design grading curve of coarse graded high modulus asphalt concrete with skeleton embedded structure.

Step 3 including the following steps: A) choosing 5~6 oil-stone ratios that interval is 0.3%~0.4% according to the grading curve designed in step 2, forming 4~6 specimens under each oil-stone ratio, determining the gross volume density and the theoretical maximum density of the specimens.

B), calculate the dry density of the mix, voids in mineral aggregate VMA and voids in coarse aggregate VCA, draw the quadratic curve between dry density, VMA, VCA and oil-stone ratio respectively, select the average of the oil-stone ratio OAC1 corresponds to the minimum value of VMA, the oil-stone ratio OAC2 corresponds to the minimum value of VCA and the oil-stone ratio OAC3 corresponds to the maximum value of dry density of the mix as the optimum oil-stone ratio OAC of coarse graded high modulus asphalt concrete with skeleton embedded structure, that is: OAC=(OAC1+OAC2+OAC3)/3.

The low labeled hard asphalt is AH-30#.

The maximum nominal size of coarse aggregate is 26.5 mm.

The gross volume density of the specimen is measured by wax sealing method.

The theoretical maximum density of the specimen is measured by vacuum method.

The mix designed by the method above including asphalt, coarse aggregate, fine aggregate and mineral powder, the design gradation curve and the optimum oil-stone ratio.

Coarse graded high modulus asphalt concrete with skeleton embedded structure designed in this invention is made up of low labeled hard asphalt AH-30# with penetration is about 30 (0.1 mm), coarse aggregate of the maximum nominal size no smaller than 26.5 mm, fine aggregate and mineral power.

This invention including the following steps:

1, Choose the domestic low-labeled hard asphalt with penetration no higher than 30 (0.1 mm) as the cementing material of high modulus asphalt concrete, usually adopt modified asphalt, natural bitumen (lake asphalt, rock asphalt), adjusting agent, which not only saves the project cost, and easy to project operation and quality control.

2, choose Coarse aggregate with maximum nominal size is not less than 26.5 mm, the coarse aggregate, fine aggregate and mineral powder used should be consistent with the requirements of the technical specification for construction of highway asphalt pavement (JTG F40-2004), this is different from the technical requirements of high modulus asphalt concrete with the nominal maximum particle size is not more than 19 mm abroad.

Building mineral aggregate gradation of the mix by the idea of course aggregate gap gradation is completely different from the gradation composition method of high modulus asphalt concrete home and abroad.

(1), according to the need of designation, determine the aggregate passing rate of the three key meshes, cut-off point of coarse aggregate and fine aggregate 4.75 mm and 0.075 mm.

(2), using formula 1 the maximum nominal size can be determined and the aggregate passing rate of the two key meshes of 4.75 mm, calculate coefficient A and B, determine the specific expression of the formula 1; using formula 2 with the aggregate passing rate of the two key meshes of 4.75 mm and 0.075 mm, calculate coefficient C and D, determine the specific expression of the formula 2.

$$P_{di} = A(d_i)^B \quad \text{(formula 1)}$$

$P_{di}$—Passing rate of coarse aggregate sieve size $d_i$, %;
$d_i$—sieve size of coarse aggregate, mm
A, B—coefficient $$P_{dj} = C(d_j)^D \quad \text{(formula 2)}$$

$P_{dj}$—Passing rate of fine aggregate sieve size $d_j$, %;
$d_j$—sieve size of fine aggregate, mm
C, D—coefficient (3), calculate the passing rate of each sieve between the maximum nominal size and 4.75 mm by formula 1; calculate the passing rate of each sieve between 4.75 mm and 0.075 mm by formula 2, then get the design grading curve of coarse graded high modulus asphalt concrete with skeleton embedded structure.

4. Using gradation design method of asphalt mixture based on closest compact condition to select the optimal oil-stone ratio of coarse graded high modulus asphalt concrete with skeleton embedded structure, which is the core of the patent invention, is not only different from the optimal oil-stone ratio selecting method by asphalt film thickness abroad, and also different from the optimal oil-stone ratio selecting method by the designed porosity 4%.

(1) For the grading curve designed in step 3, choose 5~6 oil-stone ratios that interval is 0.3%~0.4% according to the experience, forming 4~6 specimens under each oil-stone ratio, determining the gross volume density and the theoretical maximum density of the specimens.

(2) calculate the dry density of the mix, voids in mineral aggregate VMA and voids in coarse aggregate VCA, draw the quadratic curve between dry density, VMA, VCA and oil-stone ratio respectively, select the average of the oil-stone ratio OAC1 corresponds to the minimum value of VMA, the oil-stone ratio OAC2 corresponds to the minimum value of VCA and the oil-stone ratio OAC3 corresponds to the maximum value of dry density of the mix as the optimum oil-stone ratio OAC of coarse graded high modulus asphalt concrete with skeleton embedded structure, that is: OAC=(OAC1+OAC2+OAC3)/3.

5. Using the optimum oil-stone ratio of coarse graded high modulus asphalt concrete with skeleton embedded structure determined in step 4 to assess the road performance index high temperature properties, strength and modulus, fatigue performance and so on. Confirm the mixture has good high temperature stability and excellent mechanical strength, modulus and fatigue life through laboratory test and actual engineering verification.

Coarse graded high modulus asphalt concrete designed and prepared by this method, because of the adoption of AH-30# low-labeled hard asphalt as a cementing material, the choosing of coarse grain type with the maximum nominal size no less than 26.5 mm, the using of the idea of course aggregate gap gradation to building mineral aggregate gradation of the mix and gradation design method of asphalt mixture based on closest compact condition to select the optimal oil-stone ratio of asphalt concrete, so that the high modulus asphalt concrete can form the most closely skeleton embedded structure, and significantly improve the high-temperature stability of asphalt mixture, while improving the modulus of asphalt mixture more than 30%, and reduce the project cost, which can be used as the material of middle and lower layer of overloading traffic long-life asphalt pavement.

FIGURE LEGENDS

FIG. 1: quadratic curve between dry density and oil-stone ratio

Figure 2:
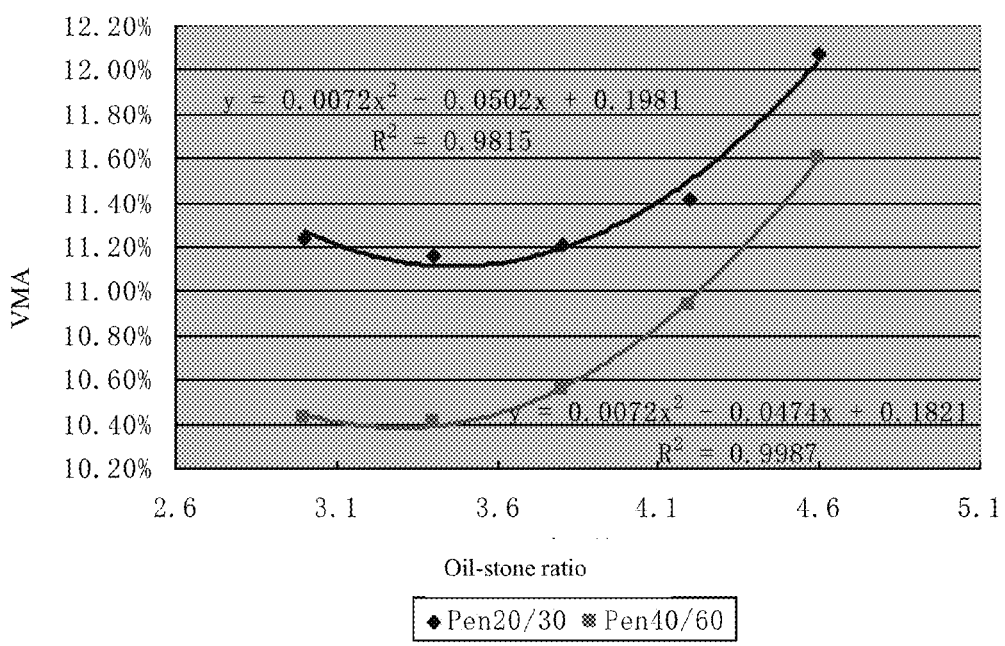

FIG. 2: quadratic curve between VMA and oil-stone ratio

Figure 3:
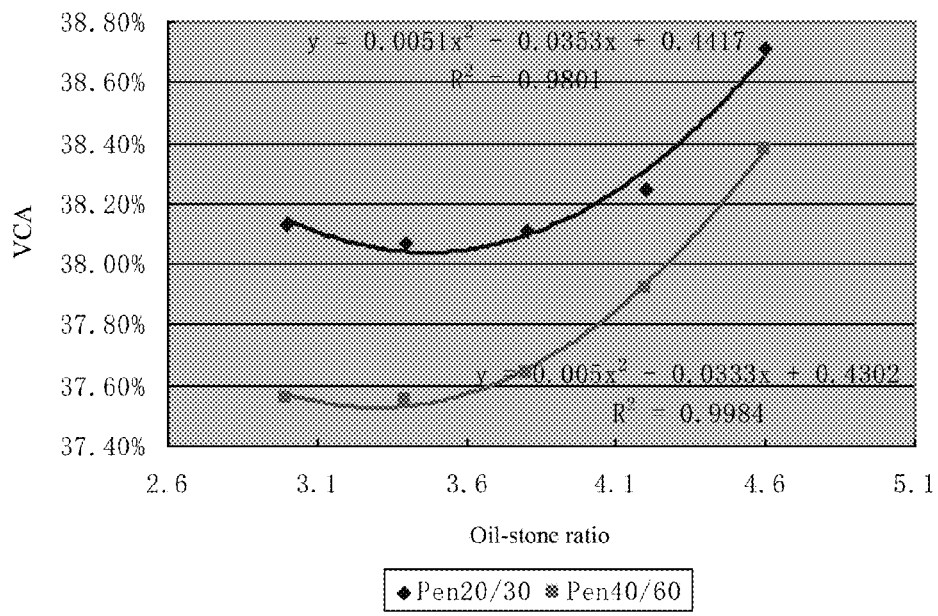

FIG. 3: quadratic curve between VCA and oil-stone ratio

Figure 4:
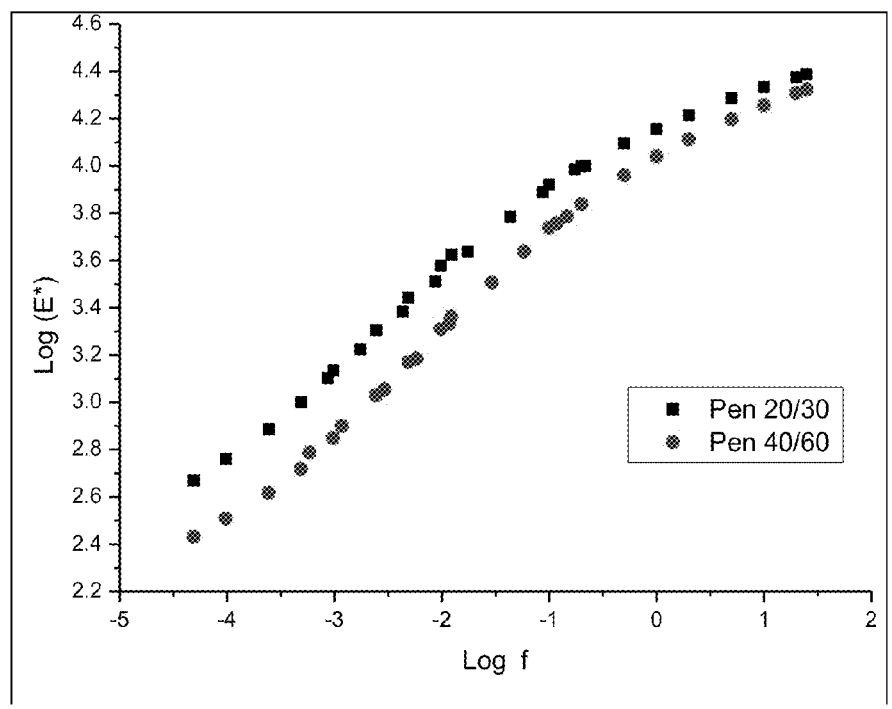

FIG. 4: complex modulus master curve of two kinds of mixture

Figure 5:
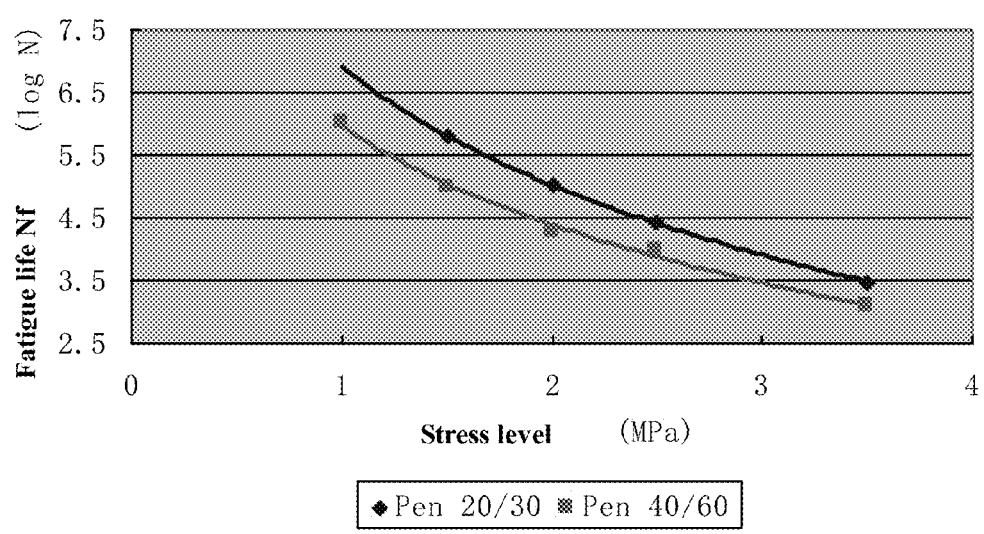

FIG. 5: fatigue curve of two kinds of material, in the form of log N=$a_1$×ln σ+$b_1$

SPECIFIC IMPLEMENTATION METHODS

The following combined with an engineering example to further illustrate the design and preparation methods of coarse graded high modulus asphalt concrete with skeleton embedded structure, the following example is used to illustrate this invention not to restrict the invention.

An expressway located in summer hot and humid area, and will use coarse graded high modulus asphalt concrete with skeleton embedded structure HMAC25, according to the content of the present invention, the implementation of the specific as follows:

Step 1: Choosing the Raw Materials

According to the actual situation of the project, choose two kind of asphalt of different penetration level: one is Pen40/60 asphalt that meets the relevant requirements of 'Technical Specifications for Construction of Highway Asphalt Pavement (JTG F40-2004)'; the other is Pen20/30 low labeled hard asphalt with penetration no greater than 30; and coarse aggregate with the maximum nominal size no smaller than 26.5 mm, fine aggregate and filler as the raw material to prepare high modulus asphalt concrete.

Step2: Determining Design Gradation Curve

Design HMAC25 high modulus asphalt concrete in accordance with the requirements, and then the maximum aggregate size of the mixture is 31.5 mm, the maximum nominal size is 26.5 mm. choose the passing rate of the three key meshes respectively, $P_{26.5\ mm}=97.5\%$, $P_{4.75\ mm}=30\%$, $P_{0.075\ mm}=5\%$, then simultaneous formula 1, 2 can get equations for the formula:

$$\begin{cases} 97.5 = A(26.5)^B \\ 30 = A(4.75)^B \\ 30 = C(4.75)^D \\ 5 = C(0.075)^D \end{cases}$$

Solving the equations can obtain parameters A, B, C, D, respectively:

A=10.3071
B—0.6857
C=15.3055
D=0.4319

Then the design gradation curve of the asphalt concrete is shown in table 1.

TABLE 1

Design gradation of HMAC25

| Sieve size mm | 31.5 | 26.5 | 19 | 16 | 13.2 | 9.5 | 4.75 | 2.36 | 1.18 | 0.6 | 0.3 | 0.15 | 0.075 |
|---|---|---|---|---|---|---|---|---|---|---|---|---|---|
| Passing rate % | 100 | 97.5 | 77.6 | 69 | 60.5 | 48.3 | 30 | 22.2 | 16.4 | 12.3 | 9.1 | 6.7 | 5 |

Steps 3: Determining the Optimum Oil-Stone Ratio

According to the gradation curve designed in step 1, separately in view of asphalt Pen 20/30 and Pen 40/60, analysis the Marshall index of HMAC25 mixture by the method of big Marshall Compaction test, the results are shown in table 2.

| asphalt | Oil-stone ratio (%) | bulk volume density (g/cm3) | VCA | VMA | theoretical density (g/cm3) | VV | VFA | stability (KN) |
|---|---|---|---|---|---|---|---|---|
| Pen 20/30 | 3 | 2.5465 | 38.13% | 11.24% | 2.6637 | 4.40% | 60.86% | 26.92 |
| | 3.4 | 2.5589 | 38.07% | 11.16% | 2.6509 | 3.47% | 68.89% | 25.80 |
| | 3.8 | 2.5672 | 38.11% | 11.21% | 2.6367 | 2.64% | 76.46% | 25.46 |
| | 4.2 | 2.5711 | 38.25% | 11.42% | 2.6211 | 1.91% | 83.29% | 24.29 |
| | 4.6 | 2.5620 | 38.71% | 12.07% | 2.6041 | 1.62% | 86.58% | 23.14 |
| Pen 40/60 | 3 | 2.5700 | 37.56% | 10.43% | 2.6600 | 3.38% | 67.54% | 18.30 |
| | 3.4 | 2.5804 | 37.55% | 10.41% | 2.6411 | 2.30% | 77.93% | 23.91 |
| | 3.8 | 2.5865 | 37.64% | 10.55% | 2.6234 | 1.41% | 86.67% | 24.71 |
| | 4.2 | 2.5851 | 37.92% | 10.94% | 2.6067 | 0.83% | 92.43% | 22.77 |
| | 4.6 | 2.5756 | 38.38% | 11.60% | 2.5912 | 0.60% | 94.82% | 21.40 |

表2: Marshall Test results of SAC25 mixtures of the two kinds of asphalt

FIG. 1, FIG. 2 and FIG. 3 shows that:

For asphalt mixture of Pen 20/30

1) The corresponding oil-stone ratio OAC1 to the maximum value of asphalt mixture dry density is 3.48%.
2) The corresponding oil-stone ratio OAC2 to the minimum value of voids in mineral aggregate VMA is 3.49%.
3) The corresponding oil-stone ratio OAC3 to the minimum value of voids in coarse aggregate VCA is 3.46%.
4) In conclusion, the oil-stone ratio OAC of coarse graded high modulus asphalt concrete with skeleton embedded structure HMAC25 determined by gradation design method of asphalt mixture based on closest compact condition is (OAC1+OAC2+OAC3)/3=(3.48%+3.49%+3.46%)/3=3.47%.

For asphalt mixture of Pen 40/60

1) The corresponding oil-stone ratio OAC1 to the maximum value of asphalt mixture dry density is 3.31%.
2) The corresponding oil-stone ratio OAC2 to the minimum value of voids in mineral aggregate VMA is 3.29%.
3) The corresponding oil-stone ratio OAC3 to the minimum value of voids in coarse aggregate VCA is 3.33%.
4) In conclusion, the oil-stone ratio OAC of coarse graded high modulus asphalt concrete with skeleton embedded structure HMAC25 determined by gradation design method of asphalt mixture based on closest compact condition is (OAC1+OAC2+OAC3)/3=(3.31%+3.29%+3.33%)/3=3.31%.

Then, the oil-stone ratio of coarse graded high modulus asphalt concrete with skeleton embedded structure HMAC25 for Pen 20/30 is 3.47%, the corresponding bulk volume relative density is 2.5615, porosity is 3.32%, the oil-stone ratio of HMAC25 for Pen 40/60 is 3.31%, the corresponding bulk volume relative density is 2.5796, porosity is 2.51%.

Step 4: To Carry Out the Road Performance Verification Test

The test of comparing the road performance of two kinds of asphalt mix according to the oil-stone ratio selected in step 3.

(1) High Temperature Stability Verification Test

Forming rutting specimens by 98% compaction degree of the oil-stone ratio selected in step 3 to carry out rutting test of temperature 60° C., determining the dynamic stability and relative deformation of asphalt mixture, and the results are shown in table 3. The results show that both the mixture determined using this kind of mineral aggregate gradation and oil-stone ratio has good high temperature stability; the dynamic stability index is much higher than the design requirements.

TABLE 3 rutting test result of the two mixtures

|  |  | dynamic stability (times/mm) | relative deformation (%) |
|---|---|---|---|
| Test result | Pen 20/30 | 5933 | 1.36 |
|  | Pen 40/60 | 5409 | 1.27 |
| Technical standards |  | 1500 | 10 |

(2) The Mixture Strength Test

Table 4 shows the results of uniaxial compressive strength tests (the compaction degree of the specimen of 98%) when asphalt mix Pen 20/30 and Pen 40/60 with optimum oil-stone ratio. The results show that strength levels of asphalt mixture Pen 20/30 is obviously higher than that of Pen 40/60, increase about 70%, which shows that Pen 20/30 asphalt mixture's mechanics performance is superior.

TABLE 4 compressive strength of the two mixtures

|  | average value | standard deviation | coefficient of variation | representative value |
|---|---|---|---|---|
| Pen 20/30 | 5.60 | 0.27 | 4.89% | 5.15 |
| Pen 40/60 | 3.79 | 0.47 | 12.32% | 3.02 |

(3) Mix Dynamic Composite Modulus Test

High modulus asphalt concrete has higher modulus level compared to the common asphalt mixture, and has a higher bearing capacity. According to the definition of high modulus asphalt concrete in French, at temperature of 15° C. and under dynamic load of 10 Hz, the modulus of the mix requires to get 14000 MPa. Determine the dynamic complex modulus of these two kinds of mixture by the international standard of complex modulus test method, the results shown in table 5.

The results show that, at temperature of 20° C. and under dynamic load of 10 Hz, the complex modulus of Pen 20/30 asphalt mixture of 21528 MPa, the complex modulus of Pen 40/60 asphalt mixture of 17996 MPa, the former is about 20% higher than the latter. The complex modulus of Pen 20/30 asphalt mixture is about 26740 MPa and the complex modulus of Pen 40/60 asphalt mixture is about 22380 MPa at temperature of 15° C. through the complex modulus of 10 Hz under different temperature, both which are much higher than the modulus requirement of high modulus asphalt mixture in French. The causes include the use of hard asphalt and the gradation the mixture used and oil-stone ratio.

TABLE 5

Complex modulus and phase angle of the two mixtures

| | material | | | | | |
|---|---|---|---|---|---|---|
| | 30# asphalt concrete | | | 50# asphalt concrete | | |
| | temperature | | | | | |
| frequency | 20 | 40 | 55 | 20 | 40 | 55 |
| | Complex modulus | | | | | |
| 25 | 24387 | 10010 | 4217 | 21062 | 6130 | 2312.5 |
| 20 | 23748 | 9643 | 3779 | 20342.5 | 5718 | 2042 |
| 10 | 21528 | 7768 | 2772 | 17996 | 4331.5 | 1481.5 |
| 5 | 19310 | 6098 | 2024 | 15742.5 | 3209 | 1071.9 |
| 2 | 16419 | 4334 | 1362 | 12935.5 | 2148.5 | 706.7 |
| 1 | 14351 | 3237 | 1000 | 10950.5 | 1529 | 522.25 |
| 0.5 | 12425 | 2429 | 770 | 9128.5 | 1133.5 | 414.45 |
| 0.2 | 9996 | 1680 | 577 | 6877.5 | 794.2 | 322.2 |
| 0.1 | 8339 | 1264 | 468 | 5464.5 | 613.45 | 270.1 |

With reference to the above test data, through temperature-frequency conversion of mixture complex modulus under different temperature conditions using S type curve model, get dynamic complex modulus master curve at 20° C. of Pen 20/30 and Pen 40/60 asphalt mixture. The corresponding curve parameters are shown in table 6, the corresponding fitting curve as shown in FIG. 4.

TABLE 6

Dynamic complex modulus master curve parameters of the two asphalt mixtures

| parameters | Pen 20/30 asphalt mixture | Pen 40/60 asphalt mixture |
|---|---|---|
| $A_1$ | 2.0194 | 1.9771 |
| $A_2$ | 4.5487 | 4.4924 |
| $X_0$ | −2.5020 | −2.1597 |
| Dx | 1.4722 | 1.3938 |
| Mean Squared Error | 1.49% | 1.07% |
| 40° C.→20° C. amount of translation | 2.0611 | 2.2318 |
| 55° C.→20° C. amount of translation | 3.3084 | 3.3122 |

The main graph clearly shows that, in the same load frequency, the complex modulus of Pen 20/30 is obviously higher than that of Pen 40/60. the parameters A1 and A2 in the parameters table of fitted curve show that both the corresponding complex modulus maximum and minimum values of upper asymptote and lower asymptote of the curve of Pen 20/30 are greater than that of Pen 40/60.

(4) The Mixture Fatigue Test

The three point bending fatigue test data of the two kinds of asphalt concrete Pen 20/30 和 Pen 40/60 are gathered in Table 7. The test is carried out with Cooper fatigue testing machine, according to the stress control mode, the experiment temperature is 15° C., with stiffness modulus decreased to 50% of the initial modulus as the standard, to evaluate the fatigue life of the mixture. Test is divided into five stress levels: 1 MPa, 1.5 MPa, 2 MPa, 2.5 MPa and 3.5 MPa.

During the process of fatigue test, measure the flexural tensile strength of the two kinds of materials at the same temperature. The test use the same size of the beam specimens, three cent point load form, load model controlled according to the deformation, rate of 50 mm/min. Flexural strength data are gathered in table 7.

TABLE 7 the results of fatigue test

| material | Bending stress MPa | Stress level MPa | Fatigue life Nf (times) |
|---|---|---|---|
| Pen 20/30 | 8.33 | 1 | >2 million times |
| | | 1.5 | 610482.5 |
| | | 2 | 105180.5 |
| | | 2.5 | 26090.5 |
| | | 3.5 | 2873 |
| Pen 40/60 | 6.58 | 1 | 1020636 |
| | | 1.5 | 95495.5 |
| | | 2 | 19268 |
| | | 2.5 | 9262 |
| | | 3.5 | 1239 |

The text shows that the flexural tensile strength of the two kinds of asphalt mixture is obviously higher than common asphalt concrete. Tests before show that the flexural tensile strength of asphalt mixture Pen 60/70 is commonly 3~4 MPa, while SBS modified asphalt concrete can reach 4~6 MPa. By contrast, the flexural tensile strength of asphalt mixture Pen20/30 and Pen 40/60 is relatively higher; especially the flexural tensile strength of Pen20/30 asphalt mixture get to 8.33 MPa, about 22% higher than that of Pen 40/60 asphalt mixture. That means although the ductility decayed as the asphalt label reducing, the viscosity increased, the flexural tensile strength of the mixture is still improved significantly.

Draw fatigue curve of fatigue life and stress level according to the test result, and regress the corresponding fatigue equation, the curve as show in FIG. 5. The figure shows the fatigue life curve of the two mixtures under different stress level, which indicates that the fatigue life of the two mixtures is obviously different because of the different of the asphalt quality. the fatigue life of mixture Pen 20/30 is significantly higher than that of Pen 40/60 under the same stress level.

(5) Summary

The road performance verification test above shows that coarse graded high modulus asphalt concrete HMAC25 designed and prepared by this method has good high temperature stability and excellent mechanical performance, fatigue performance, which has very excellent road performance.

The invention claimed is:

1. A mix composition determination method for coarse graded high modulus asphalt concrete with a skeleton embedded structure, the method comprising:
   first, determining a design grading curve of the coarse graded high modulus asphalt concrete with a skeleton embedded structure, based on calculating a passing rate value of each key mesh of an aggregate;
   second, determining an optimal oil-stone ratio of asphalt concrete, such that the asphalt concrete provides a good performance, wherein the method further comprising:
      choosing a low labeled hard asphalt with a penetration degree of no higher than 30 as a cementing material;
      choosing a coarse aggregate, a fine aggregate and a mineral powder, wherein a maximum nominal size of the coarse aggregate is no smaller than 26.5 mm;
      choosing the maximum nominal size of the coarse aggregates and corresponding key meshes;
      determining the maximum nominal size of the coarse graded asphalt, an aggregate passing rate of three key meshes;
      using passing rate of the maximum nominal size and a mesh size $d_i$ to construct a first formula, and using passing rate of 4.75 mm and its mesh size to construct a second formula, and using the first formula and the second formula to calculate a coefficient A and a coefficient B from $P_{di}=A(d_i)^B$;
      calculating the coefficient A and the coefficient B from $P_{di}=A(d_i)^B$ using an aggregate passing rate, $P_{di}$, of meshes having diameters, $d_i$, including the maximum nominal size and 4.75 mm;
      using passing rate of the maximum nominal size and a mesh size $d_i$ to construct a first formula, and using passing rate of 0.075 mm and its mesh size to construct a second formula, and using the first formula and the second formula to calculate a coefficient C and a coefficient D from $P_{dj}=C(d_j)^D$;
      calculating the coefficient C and the coefficient D from $P_{dj}=C(d_j)^D$ using an aggregate passing rate, $P_{dj}$, of meshes having diameters, $d_j$, including diameters of 4.75 mm and 0.075 mm;
      choosing 5-6 oil-stone ratios that interval is 0.3%-0.4% according to the design grading curve;
      forming 4-6 specimens under each oil-stone ratio;
      determining a gross volume density and a theoretical maximum density of the specimens;
      calculating a dry density of the mix, voids in mineral aggregate (VMA) and voids in coarse aggregate (VCA);
      drawing a quadratic curve between the dry density of the mix, the VMA, the VCA and the oil-stone ratio;
      selecting an average of a first oil-stone ratio (OAC1) that corresponds to the minimum value of the VMA, a second oil-stone ratio (OAC2) that corresponds to the minimum value of the VCA and a third oil-stone ratio (OAC3) that corresponds to the maximum value of dry density of the mix;
      determining an optimum oil-stone ratio OAC of coarse graded high modulus asphalt concrete with skeleton embedded structure from the following:

$$OAC=(OAC1+OAC2+OAC3)/3; \text{ and}$$

preparing coarse graded high modulus asphalt concrete having the optimum oil-stone ratio OAC.

2. The method according to claim 1, wherein the low labeled hard asphalt has a penetration degree of 30.

3. The method according to claim 1, wherein the maximum nominal size of coarse aggregate is 26.5 mm.

4. The method according to claim 1, wherein the gross volume density of the specimen is measured by wax sealing method.

5. The method according to claim 1, wherein the theoretical maximum density of the specimen is measured by vacuum method.

6. The method of claim 1, wherein choosing the maximum nominal size of coarse aggregates and corresponding key meshes further comprises choosing the maximum nominal size of the asphalt mixture, the 4.75 mm and the 0.075 mm aggregate, followed by giving an expected passing rate value of each key meshes.

* * * * *